3,125,462
TEXTILE FABRICS TREATED WITH ETHYLENE-PROPYLENE COPOLYMERS
Michael R. Rachinsky, Wilmington, Del., assignor to Hercules Powder Company, Wilmington, Del., a corporation of Delaware
No Drawing. Filed Apr. 10, 1962, Ser. No. 186,324
9 Claims. (Cl. 117—139.5)

This invention relates to textile fabrics having uniformly distributed therethrough ethylene-propylene copolymers or modified ethylene-propylene copolymers and to the preparation of such fabrics.

The incorporation of polymers into textile materials to impart such desirable properties as abrasion resistance, a soft hand, tear and/or tensile strength, impermeability to certain solvents or to bond the fibers as in nonwovens is well known. However, the treated textile materials of the prior art all suffer certain disadvantages. Some fabrics, as, for example, those treated with natural rubber latex, have a rubbery hand, i.e., a rubbery feel when the fabric is handled. Other fabrics such as those treated with poly(vinyl acetate), poly(vinyl chloride) and certain copolymers of vinyl acetate and vinyl chloride have a papery hand, i.e., the fabric has a crisp, brittle feel and conveys the impression of thinness and fragility. In still other fabrics, the prior art treating compositions produce color, lack strength and are washed away by solvents.

It has now been found that woven, knitted, or nonwoven textile fabrics having uniformly distributed therethrough a polymeric substance comprising at least one polymer selected from the group consisting of ethylene-propylene copolymers and ethylene-propylene copolymers modified by the attachment thereto of a plurality of polar groups can be prepared by treating textile materials with latices containing said polymeric substances. The resulting fabrics are strong, abrasive resistant, exhibit a soft hand, are chemically resistant to most household and industrial solvents, acids, caustics, etc., and can be used as industrial filter cloths, clothing, interliners, water-repellent garments, shoe innersoles, electrical tapes, washable gaskets, table place mats, synthetic leathers, etc.

The ethylene-propylene copolymers useful in the practice of this invention are the normally solid predominantly amorphous copolymers. These copolymers are materials known to the art which can be prepared by copolymerizing ethylene with propylene by any of several methods, such as the methods described in British Patent No. 857,183, French Patent No. 1,242,404, and Belgian Patents Nos. 462,305 and 462,306. Those copolymers containing from about 20 to about 45 mole percent propylene and having a reduced specific viscosity (RSV) of from about 1.0 to about 7.0 are most useful in this invention.

The term "reduced specific viscosity," which is a function of molecular weight, is used herein to describe the $\eta_{sp}/C$. determined on a 0.1% solution of the copolymer in decahydronaphthalene measured at a temperature of 135° C.

For some purposes it may be desirable to modify an ethylene-propylene copolymer with a polar compound, i.e., an organic or inorganic compound which, when reacted with an ethylene-propylene copolymer, affords polar groups. Exemplary of the polar compounds which can be so reacted are the organic unsaturated polar compounds such as maleic anhydride, methacrylic acid, acrylic acid, methyl acrylate, acrylamide, acrylonitrile, allyl alcohol, allylamine, vinyl pyridine, etc., and the inorganic polar compounds, as, for example, phosphorus halides such as phosphorus trichloride, alkali sulfites such as sodium sulfite, alkali bisulfites such as sodium bisulfite, etc. These polar compounds can be reacted with an ethylene-propylene copolymer by a free-radical mechanism using a compound capable of supplying free radicals at a given temperature and sufficient heat to insure that free radicals will be formed. Exemplary of the attachment of polar groups are the following equations:

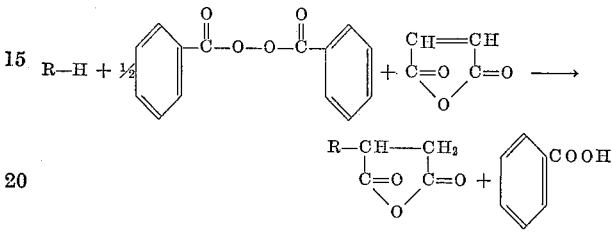

R—H being an ethylene-propylene copolymer in each equation. The compound used to supply free radicals and the temperature of the reaction will depend on the polar compound being reacted and can readily be determined by one skilled in the art. The desirable number of polar groups attached to an ethylene-propylene copolymer varies over a wide range. However, in general, a desirable number will be attached when from about 0.05% to about 2.0% by weight of polar compound is reacted with an ethylene-propylene copolymer.

The latices used in the preparation of the textile fabrics of this invention can contain, besides the modified or unmodified ethylene-propylene copolymers, other polymeric thermosetting or thermoplastic materials or combinations thereof. Exemplary of the materials useful are styrene-butadiene copolymer, epoxidized poly(α-methylstyrene-butadiene), polyethylene, polystyrene, etc.

The latices useful in the practice of this invention can be prepared by any of a number of procedures. One convenient procedure is to prepare a solution of a modified or unmodified ethylene-propylene copolymer in an organic solvent and then form an emulsion by mixing with water and a small amount of surface active agent, i.e., an anionic surface active agent such as potassium oleate, sodium lauryl sulfate, etc., a nonionic surface active agent, such as nonyl phenyl ethylene oxide, sorbitan trilaurate, polyoxyethylene lauryl alcohol adduct, etc.; or a mixture of an anionic and a nonionic surface active agent. The emulsion can then be stripped of the organic solvent or solvents by steam distillation to give a dilute latex. This latex can be concentrated by further distillation or by other known methods. Latices having various total solids composition can be prepared. In general, however, the latices will have a total solids content of at least about 4% by weight.

Any woven, knitted or nonwoven textile material can be treated with a latex containing a modified or unmodified ethylene-propylene copolymer in accordance with the process of this invention. Exemplary of the various textile materials are those containing either natural or synthetic fibers, such as cellulose, wood, jute, sisal, ramie, hemp, manilla, wool, silk, cotton asbestos and glass, as well as fibers or filaments of rayon, those cellulose esters such as cellulose acetate, the polynosic rayon fibers such as that marketed under the trade name of Zantrel, vinyl resin fibers such as those of poly(vinyl chloride), copolymers of vinyl chloride with vinyl acetate, vinylidene chloride or acrylonitrile containing a major proportion of vinyl chloride in the polymer molecule and/or polyacrylonitrile with vinyl acetate, methacrylonitrile, vinyl pyridine, or mixtures of such comonomers and containing a major proportion of acrylonitrile in the copolymer molecule; also condensation polymers such as polyamides of the nylon type, polyesters such as poly(ethylene terephthalate), and the like.

The nonwoven textile materials to be treated in accordance with this invention can be prepared by various methods as follows:

(1) The nonwoven mat or web can be formed by carding when the fibers are of such length and flexibility as to be amenable to the carding operation. The thin web or mat obtained from a single card can be treated in accordance with the present invention; or, if desired, a plurality of such webs can be superposed to build up the mat to sufficient thickness for the end use intended. In building up such a mat, alternate layers of carded webs can be disposed with their fiber orientation directions disposed at different angles with respect to intervening layers.

(2) Mats can also be formed by the deposition of fibers, either natural or artificial, from an air stream. Thus, continuous filaments can be fed to a cutter or breaker which discharges the fibers into the discharge side of a blower. Suitable conduits can be provided to guide the fibers to a collecting screen or air pervious structure for collecting the fibers in the form desired. The screen can be in the form of an endless traveling belt passing through the lower portion of a tower into the upper portion of which the blown fibers are introduced by means of the conduit.

(3) Likewise, mats can be formed by the deposition of fibers from a suspension in water similar to the method used in the papermaking trade. After the fiber is beaten with water to give a uniform suspension or slurry, the water-insoluble fiber can be deposited as a sheet by removal of the water.

(4) The fibers and filaments can be formed by direct spraying from a solution or molten mass thereof. This is a conventional procedure for the formation of glass fibers or mineral wool fibers as well as those of nylon or of thermoplastic materials, such as vinyl resins adapted to be dissolved in a suitable solvent, such as acetone or dimethyl formamide or to be melted.

(5) Another procedure can involve the extrusion of continuous filaments either from solutions of the filament-forming material or from molten masses thereof and the cutting or breaking of the filaments to fibers of a predetermined length, which can be fed to a hopper at the top of a settling tower into which they can be discharged by conventional feeding devices at the bottom of which a traveling or stationary screen can be deposited for collection of the fibers.

The textile material can be treated with the copolymer latex in a number of ways, for example, the material can be saturated by dipping or running a continuous belt of the material through a trough of the latex. The latex can also be applied to the material by spray or foam techniques. Still other methods of applying the latex will be apparent to those skilled in the art.

The amount of copolymer latex employed will embrace a wide range of proportions depending upon the specific textile material being treated, the specific modified or unmodified latex being employed and the properties desired in the finished fabric. In general, the amount of latex employed in the treatment of woven and knitted material will be sufficient to yield a fabric containing from about 4% to about 30%, more preferably from about 5% to about 25% of the polymeric substance by weight. The amount of polymeric substance in the fabric may also be expressed as percent add-on which is the percent increase in the weight of the fabric due to the addition of the polymeric substance. It will, of course, be obvious that, when treating nonwoven textile materials, a relatively larger amount of latex, sufficient to bond the fibers together and thereby impart substantial tensile and tear strength properties to the product must be incorporated in the material. In general, the nonwoven fabrics will contain from about 10% to about 70%, more preferably from about 30% to about 65% of polymeric substance by weight.

In order to form a coherent structure wherein the textile material and the modified or unmodified ethylene-propylene copolymer are united, it is necessary to heat the treated material to a temperature sufficient to cause the copolymer to flow, but not sufficient to fuse or deform the fibers of the material. This heat treatment can be accomplished in any suitable manner. The simplest method to use in the case of treated woven and knitted material is to remove excess latex by passing the material through nip rollers at 20–40 p.s.i and then dry and heat on a drum drier at a temperature of from about 110° C. to about 200° C. The treated nonwovens are usually pressed and heated simultaneously. Generally, a temperature ranging from about 110° C. to about 200° C. and a pressure of from about 150 p.s.i. to about 500 p.s.i. will be used. Of course, the treated nonwoven material can be dried prior to the heat pressing treatment if desired.

In certain cases, it may be advantageous to incorporate a cross-linking agent or agents in the latex which during the heating cross-link the copolymer, thereby increasing its strength and solvent and heat resistance. Typical cross-linking agents which can be employed are the organic peroxides such as dibenzyl peroxide, bis($\alpha,\alpha$-dimethylbenzyl) peroxide and tert-butyl (pentamethyl ethyl) peroxide; the poly azidoformates such as tetramethylene-bis(azidoformate) and $\alpha,\alpha'$-p-xylylene-bis(azidoformate); the poly sulfonazides such as 1,10-decane-bis(sulfonazide) and 1,3-benzene-bis(sulfonazide); and the poly diazoacetates such as bis(diazoacetate) ester of 1,10-decanediol and p-bis(diazoacetyl) benzene.

Various auxiliary modifiers, usually in minor amounts, such as dyes, pigments, fillers, water miscible waxes and resins and the like may be employed as desired depending upon the use to which the product is to be put. For example, color can be imparted to the material by incorporating pigments in the latex or by dyeing the structural fibers prior to treating with the latex. Obviously, there are many cases in which an auxiliary modifier is not required or desired and excellent results are achieved without them.

The following examples are presented for purposes of illustration, parts and percentages being by weight unless otherwise specified.

EXAMPLE 1

A latex was prepared from an elastomeric ethylene-propylene copolymer having an RSV of 3.0 and containing 34.7 mole percent propylene. To 225 parts of a 5% solution of the copolymer in chlorobenzene was added 10 parts of a 20% aqueous solution of an alkyl sulfate anionic surface active agent. After vigorously agitating one minute, 75 additional parts of water were added and the water-in-oil emulsion inverted to form an oil-in-water emulsion, which was agitated an additional 5 minutes. From this emulsion, a dilute latex was formed by steam stripping the chlorobenzene. The resulting latex had a solids content of 4.4% and an average particle size of <0.5 micron. It was concentrated by mixing with 10% of a 1% aqueous solution, based on the total volume of latex, of carboxymethylcellulose and allowed to stand overnight. Two layers formed. The bottom layer, essentially water, was removed leaving a latex containing approximately 50% total solids. This concentrated latex was then diluted by the addition of water. Four aliquots having different solids content were prepared. Samples of eighty-square cotton broadcloth were saturated with each of the latex aliquots by dipping in the latex. The thus treated samples were put through a nip roll at 30 p.s.i. and air dried. They were then passed through a drum drier at 135° C. for 2 minutes. The treated samples had a fuller body and softer hand than the untreated fabric. In Table I the abrasion resistance of the treated samples is compared to an untreated control.

*Table I*

|         | Total Solids Content, percent | Add-on,[1] percent | Average Dry Taber Abrasion (cycles to failure) |
|---------|---:|---:|---:|
| Control |   | 0   | 730 |
|         | 1 | 2.4 | 850 |
|         | 5 | 4.6 | 1,317 |
|         | 10| 11.6| 2,833 |
|         | 21.8 | 20.1 | 2,200 |

[1] Percent increase in the dry weight of the cotton broadcloth caused by the copolymer.

EXAMPLE 2

A latex having a total solids content of 46.4% was prepared from an ethylene-propylene copolymer having an RSV of 3.7 and containing 33.4 mole percent propylene by the process described in Example 1. The latex was diluted to 10% total solids content by adding water. The resulting dilute latex was used to treat a sample of eighty-square cotton broadcloth as described in Example 1. The treated material was then tested for tensile strength, tear strength, abrasive resistance and stiffness. The results of these tests are tabulated below along with the respective properties of an untreated control sample.

*Table II*

| | Add-on,[1] Percent | Average Cantilever Stiffness (cm. at 41° C.) | Average Dry Taber Abrasion (Cycles to Failure) | Average Dry Tensile Strength (lb./in. width) | Dry Trapezoidal Tear Strength (lb./in. Width) |
|---|---|---|---|---|---|
| Control | 0 | 3.8 | 730 | 30.0 | 3.8 |
| Treated Sample | 10.2 | 5.2 | 1,096 | 34.7 | 4.6 |

[1] Percent increase in the dry weight of the cotton broadcloth caused by the copolymer.

EXAMPLE 3

The concentrated latex of Example 2 was diluted with water and mixed with an anionic emulsion of low molecular weight polyethylene to give a latex containing 20% solids based on the ethylene-propylene copolymer and 1% solids based on the polyethylene. The resulting latex was used to treat a sample of eighty-square cotton broadcloth as described in Example 1. The treated material was tested and compared with an untreated control sample as described in Example 2. The results of these tests are tabulated below.

*Table III*

| | Add-on,[1] Percent | Average Cantilever Stiffness (cm. at 41° C.) | Average Dry Taber Abrasion (Cycles to Failure) | Average Dry Tensile Strength (lb./in. width) | Dry Trapezoidal Tear Strength (lb./in. Width) |
|---|---|---|---|---|---|
| Control | 0 | 3.8 | 730 | 30.0 | 3.8 |
| Treated Sample | 21 | 5.7 | 2,769 | 38.4 | 4.8 |

[1] Percent increase in the dry weight of the cotton broadcloth caused by the polymers.

EXAMPLE 4

This example demonstrates the use of a modified ethylene-propylene copolymer.

To 528 parts of a 5.3% solution of an ethylene-propylene copolymer (RSV 2.8, 46 mole percent propylene) in chlorobenzene was added 1.35 parts of maleic anhydride and 1.67 parts of benzoyl peroxide. The reaction mixture was agitated for 6 hours at a temperature of 50° C. and then cooled to 25° C. At this time 200 parts of the resulting solution was emulsified by adding a solution of 1.5 parts of an alkyl sulfate anionic surface active agent in 11.5 parts of 3.5% aqueous sodium hydroxide and vigorously agitating. After 5 minutes 75 additional parts of water were added and the water-in-oil emulsion inverted to form an oil-in-water emulsion. From this emulsion, a dilute latex was formed by steam stripping the chlorobenzene. The resulting latex had a solids content of 4.02% and an average particle size of <0.5 micron. The latex was concentrated as described in Example 1 and then diluted with water to give a latex containing 5% total solids. The resulting latex was used to treat a sample of eighty-square cotton broadcloth as described in Example 1. The treated material was tested and compared with an untreated control sample as described in Example 2. The results of these tests are tabulated below.

*Table IV*

| | Add-on,[1] Percent | Average Cantilever Stiffness (cm. at 41° C.) | Average Dry Taber Abrasion (Cycles to Failure) | Average Dry Tensile Strength (lb./in. width) | Dry Trapezoidal Tear Strength (lb./in. Width) |
|---|---|---|---|---|---|
| Control | 0 | 3.8 | 730 | 30.0 | 3.8 |
| Treated Sample | 5 | 4.8 | 3,059 | 38.0 | 3.8 |

[1] Percent increase in the dry weight of the cotton broadcloth caused by the modified copolymer.

EXAMPLE 5

The concentrated latex of Example 4 was diluted with water and mixed with an anionic latex of an epoxidized α-methylstyrene-butadiene copolymer (the ratio of α-methylstyrene to butadiene was 1:1 by weight and it had an epoxide equivalent of 469, i.e., 469 g. of polymer per mole of epoxide) and a nitirogenous thermosetting resin sold under the name "Zeset S" to give a latex containing 12% solids based on the modified ethylene-propylene copolymer, 10% solids based on the epoxidized α-methylstyrene-butadiene copolymer and 1% solids based on the nitrogenous thermosetting resin This latex was used to treat a sample of eighty-square cotton broadcloth as described in Example 1 except that it was dried for 10 minutes at a temperature of 163° C. The treated material was tested and compared with an untreated control sample as described in Example 2. The results of these tests are tabulated below.

*Table V*

| | Add-on,[1] Percent | Average Cantilever Stiffness (cm. at 41° C.) | Average Dry Taber Abrasion (Cycles to Failure) | Average Dry Tensile Strength (lb./in. width) | Dry Trapezoidal Tear Strength (lb./in. Width) |
|---|---|---|---|---|---|
| Control | 0 | 3.8 | 730 | 30.0 | 3.8 |
| Treated Sample | 20.9 | 5.2 | 2,261 | 40.7 | 4.2 |

[1] Percent increase in the dry weight of the cotton broadcloth caused by the polymers and the resin.

EXAMPLE 6

A latex having a total solids content of approximately 50% was prepared from an ethylene-propylene copolymer having an RSV of 2.2 and containing 25 mole percent propylene by the process described in Example 1. The concentrated latex was diluted with water and mixed with the nitrogenous thermosetting resin described in Example 5 and ammonium sulfate to give a latex containing 10% solids based on the ethylene-propylene copolymer, 8% solids based on the nitrogeneous thermosetting resin and 1% solids based on the ammonium sulfate. A sample of eighty-square cotton broadcloth was treated with this latex as described in Example 1. The treated material was tested and compared with an untreated control sample as described in Example 2. The results of these tests are tabulated below.

*Table VI*

| | Add-on,[1] Percent | Average Cantilever Stiffness (cm. at 41° C.) | Average Dry Taber Abrasion (Cycles to Failure) | Average Dry Tensile Strength (lb./in. width) | Dry Trapezoidal Tear Strength (lb./in. Width) |
|---|---|---|---|---|---|
| Control | 0 | 3.8 | 730 | 30.0 | 3.8 |
| Treated Sample | 27.8 | 5.2 | 1,919 | 30.8 | 3.8 |

[1] Percent increase in the dry weight of the cotton broadcloth caused by the polymer and resin.

EXAMPLE 7

A latex was prepared from an ethylene-propylene copolymer having an RSV of 3.0 and containing 31.7 mole percent propylene. The copolymer was more than 98% amorphous as determined by its solubility in n-heptane at a temperature of −15° C.

To one part of an 8% n-heptane solution of the copolymer was added one part of an aqueous solution containing 4% potassium oleate and 10% hydroxyethyl cellulose stabilizer. An emulsion was formed by vigorously agitating the resulting mixture. From this emulsion a latex was formed by steam stripping the n-heptane. The resulting latex had a 36.5% total solids content comprising 3.3% hydroxyethyl cellulose, 1.2% potassium oleate and 32.0% ethylene-propylene copolymer. This latex was diluted to 5% total solids with water and sprayed on carded, cross-laid, 4-ply fiber webs so as to give webs containing various weight percentages of binder. Fiber webs were prepared from 1.5 inch, 3-denier, crimped, crystalline, polypropylene staple. The thus treated webs were partially dried at room temperature and then completely dried under infrared radiation at a temperature of 85° C. Each web was then subjected to a heat-pressure treatment of 135° C. and 300 p.s.i. for 4 minutes. The resulting materials had smooth surfaces, low bulk densities and were relatively insensitive to water. The materials were tested to determine their physical properties, and the results are tabulated below.

*Table VII*

| Binder Weight,[1] Percent | Average Cantilever Stiffness (cm. at 41° C.) | Dry Mullen Burst (lb./in. width/oz./sq. yd.)[2] | Tensile Strength (lb./in. width/oz./sq. yd)[2] | | Elongation, Percent | |
|---|---|---|---|---|---|---|
| | | | Dry | Wet | Dry | Wet |
| 42 | 6.9 | 5.9 | 2.4 | 1.4 | 4.0 | 7.0 |
| 60 | 7.9 | 4.8 | 1.5 | 1.6 | 4.0 | 5.0 |

[1] Based on total weight of fiber plus binder.
[2] This system of units takes into account differences in the thickness of the material.

EXAMPLE 8

The dilute latex (5% total solids) of Example 7 was sprayed onto carded, cross-laid, 4-ply fiber webs prepared from 1.5 inch, 3-denier, semi-dull, poly(ethylene terephthalate) staple so as to give webs containing various weight percentages of binder. The thus treated webs were dried and heat pressed as described in Example 7. The resulting materials were tested to determine their physical properties and the results are tabulated below.

*Table VIII*

| Binder Weight, Percent[1] | Average Cantilever Stiffness (cm. at 41° C.) | Dry Tongue Tear (lb./in. width/oz./sq. yd.)[2] | Dry Tensile Strength (lb./in. width/oz./sq. yd.) | Dry Elongation, Percent |
|---|---|---|---|---|
| 48 | 5.2 | 0.17 | 0.47 | 2.0 |
| 56 | 6.3 | 0.15 | 0.49 | 2.0 |

[1] Based on total weight of fiber plus binder.
[2] This system of units takes into account differences in the thickness of the materials.

EXAMPLE 9

A latex having a total solids content of 53.5% was prepared from an ethylene-propylene copolymer having an RSV of 2.6 and containing 35.6 mole percent propylene by the process described in Example 1. The concentrated latex was diluted with water to give a latex containing 5% total solids and sprayed onto carded, cross-laid, 4-ply fiber webs prepared from 1.5 inch, 3-denier, semi-dull, crimped, polynosic rayon fibers so as to give webs containing various weight percentages of binder. The thus treated webs were dried and heat pressed as described in Example 7. The resulting materials were tested to determine their physical properties and the results are tabulated below.

*Table IX*

| Binder[1] Weight, Percent | Tensile Strength (lb./in. width/oz./sq. yd)[2] | | Elongation, Percent | |
|---|---|---|---|---|
| | Dry | Wet | Dry | Wet |
| 31 | 1.8 | 1.1 | 3.5 | 6.0 |
| 34 | 1.8 | 0.65 | 6.3 | 5.2 |

[1] Based on weight of fiber plus binder.
[2] This system of units takes into account differences in the thickness of the materials.

What I claim and desire to protect by Letters Patent is:

1. As an article of manufacture, a textile fabric having uniformly distributed therethrough an ethylene-propylene copolymer containing from about 20 to about 45 mole percent propylene and selected from the group consisting of ethylene-propylene copolymers and ethylene-propylene copolymers modified by reaction with a polar compound so as to attach polar groups to said copolymer.

2. An article of manufacture as in claim 1 wherein the polymeric substance comprises an ethylene-propylene copolymer.

3. An article of manufacture as in claim 1 wherein the polymeric substance comprises an ethylene-propylene copolymer modified by reaction with a polar compound so as to attach polar groups to said copolymer.

4. An article of manufacture as in claim 3 wherein the polar compound is maleic anhydride.

5. As an article of manufacture a woven textile fabric having uniformly distributed therethrough from about 4 to about 30% by weight of an ethylene-propylene copolymer containing from about 20 to about 45 mole percent propylene and selected from the group consisting of ethylene-propylene copolymers and ethylene-propylene copolymers modified by reaction with a polar compound so as to attach polar groups to said copolymer.

6. As an article of manufacture a nonwoven textile fabric having uniformly distributed therethrough from about 10 to about 70% by weight of an ethylene-propylene copolymer containing from about 20 to about 45 mole percent propylene and selected from the group consisting of ethylene-propylene copolymers and ethylene-propylene copolymers modified by reaction with a polar compound so as to attach polar groups to said copolymer.

7. A process of preparing a treated textile fabric having uniformly distributed therethrough an ethylene-propylene copolymer comprising the following steps: (a) treating said textile fabric with a polymer latex containing a major polymeric amount of at least one ethylene-propylene copolymer containing from about 20 to about 45 mole percent propylene and selected from the group consisting of ethylene-propylene copolymers and ethylene-propylene copolymers modified by reaction with a polar compound so as to attach polar groups to said copolymer and (b) heating the latex treated fabric to a temperature sufficient to cause the copolymer to flow but below the temperature at which fibers of the fabric fuse and deform.

8. A process of preparing a treated woven textile fabric having uniformly distributed therethrough an ethylene-propylene copolymer comprising the following steps: (a) treating said woven fabric with a polymer latex containing a major polymeric amount of at least one ethylene-propylene copolymer containing from about 20 to about 45 mole percent propylene and selected from the group consisting of ethylene-propylene copolymers and ethylene-propylene copolymers modified by reaction with a polar compound so as to attach polar groups to said copolymer in an amount sufficient to yield a fabric containing from about 4 to about 30 percent by weight of copolymer and (b) heating the latex treated fabric to a temperature sufficient to cause the copolymer to flow but below the temperature at which fibers of the fabric fuse and deform.

9. A process of preparing a treated nonwoven textile fabric having uniformly distributed therethrough an ethylene-propylene copolymer comprising the following steps: (a) treating a mat of nonwoven fibers with a polymer latex containing a major polymeric amount of at least one ethylene-propylene copolymer containing from about 20 to about 45 mole percent propylene and selected from the group consisting of ethylene-propylene copolymers and ethylene-propylene copolymers modified by reaction with a polar compound so as to attach polar groups to said copolymer in an amount sufficient to yield a fabric containing from about 10 to about 70 percent by weight of copolymer and (b) heating the latex treated fabric to a temperature sufficient to cause the copolymer to flow but below the temperature at which fibers of the fabric fuse and deform.

References Cited in the file of this patent

UNITED STATES PATENTS

| | | |
|---|---|---|
| 2,396,785 | Handford | Mar. 19, 1946 |
| 2,953,482 | Scherber | Sept. 20, 1960 |
| 3,000,867 | Fisher | Sept. 19, 1961 |